(12) United States Patent
Brown

(10) Patent No.: US 7,407,609 B2
(45) Date of Patent: Aug. 5, 2008

(54) MEMBRANES AND THEIR MANUFACTURE

(75) Inventor: Philip J. Brown, Williamson, SC (US)

(73) Assignee: Victrex Manufacturing Limited, Tornton Cleveleys, Lancashire (GB)

( * ) Notice: Subject to any disclaimer, the term of this patent is extended or adjusted under 35 U.S.C. 154(b) by 276 days.

(21) Appl. No.: 10/481,517

(22) PCT Filed: Jun. 26, 2002

(86) PCT No.: PCT/GB02/02942

§ 371 (c)(1),
(2), (4) Date: Jul. 15, 2004

(87) PCT Pub. No.: WO03/000390

PCT Pub. Date: Jan. 3, 2003

(65) Prior Publication Data

US 2004/0237786 A1    Dec. 2, 2004

(30) Foreign Application Priority Data

Jun. 26, 2001 (GB) ................................. 0115562.1
Jun. 27, 2001 (GB) ................................. 0115674.4

(51) Int. Cl.
*B29C 65/00* (2006.01)
*C08G 8/00* (2006.01)

(52) U.S. Cl. ............................ 264/41; 528/125; 528/128
(58) Field of Classification Search ................... 264/41, 264/344

See application file for complete search history.

(56) References Cited

U.S. PATENT DOCUMENTS

| 4,714,725 | A |   | 12/1987 | Hendy et al. |           |
|-----------|---|---|---------|--------------|-----------|
| 4,992,485 | A | * | 2/1991  | Koo et al.   | 521/180   |
| 5,997,741 | A | * | 12/1999 | Shimoda et al.| 210/500.27|
| 6,017,455 | A | * | 1/2000  | Shimoda et al.| 210/500.23|

FOREIGN PATENT DOCUMENTS

| EP | 0 382 356 A   | 8/1990 |
| EP | 0 499 831 A   | 8/1992 |
| WO | WO 95 15808 A | 6/1995 |
| WO | WO 95 15809 A | 6/1995 |

* cited by examiner

*Primary Examiner*—Mary Lynn F Theisen
(74) *Attorney, Agent, or Firm*—Nixon & Vanderhye

(57) ABSTRACT

Membranes comprising an aromatic ether ketone polymer (e.g. polyetherketone) in sheet or hollow fibre form are made by preparing at least a 12 wt % solution of the polymer in a solvent which is chemically inert to the polymer (e.g. concentrated sulphuric acid); forming a film of the solution in sheet or hollow form; and contacting the film with a non-solvent (e.g. more dilute sulphuric acid or acetic acid) thereby to precipitate the film.

9 Claims, 19 Drawing Sheets

PEDK 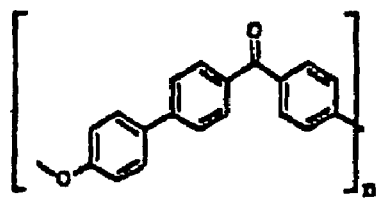 VII
PEDEK 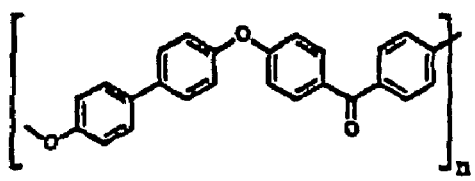 VIII
PEDEKmK 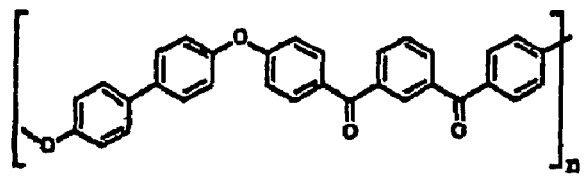 IX
PEKEN 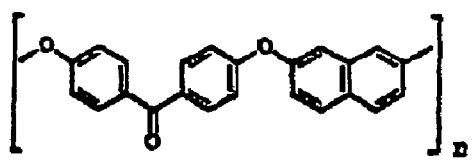 X
Figure 2

PES 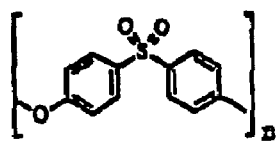 XI
PEES 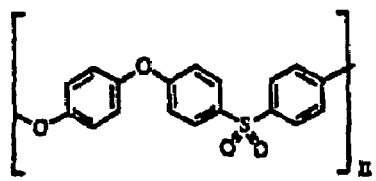 XII
SPEES 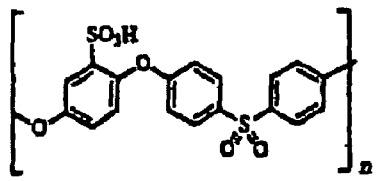 XIII
Figure 3

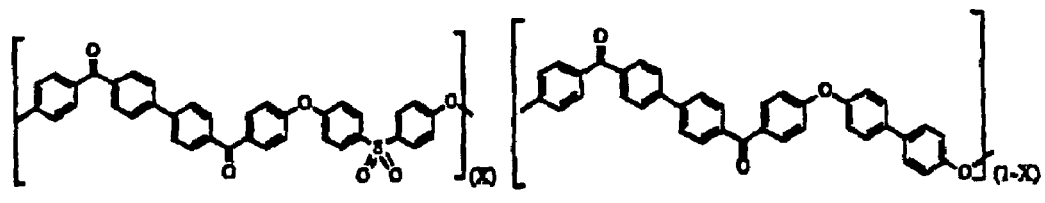
COPOL 1, (XIV)
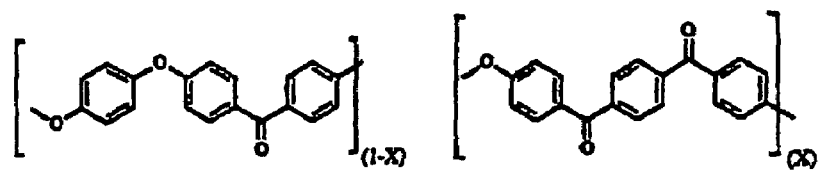
COPOL 2, (XV)
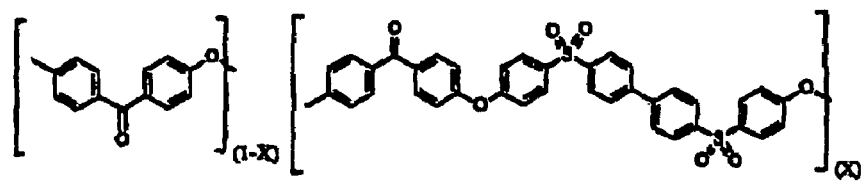
COPOL 3, (XVI)
Figure 4

Fig. 5 The effect of polymer concentration on membrane structure (a) 10% PEK (c) 18% PEK (d) 20% PEK The effect of non-solvent on membrane structure (20% PEK in 98% H₂SO₄)
(a) methanol as non-solvent

MEMBRANES AND THEIR MANUFACTURE

This application is the U.S. National Phase of International Application PCT/GB02/02942, filed 26 Jun. 2002, which designated the U.S.

This invention relates to membranes, particularly membranes suitable for use in the separation of one gas from another. The invention relates in particular to membranes comprising an aromatic ether ketone polymer.

Membranes of aromatic ether ketone polymers are known. EP 382356A describes such membranes, and their use in ultrafiltration and microfiltration. This specification states that when such membranes are suitable for ultrafiltration they may be used as the porous substrate of composite membranes for use in gas separation, pervaporation and reverse osmosis membranes.

The manufacture of the membranes of EP 382356A involves the dissolution of the selected aromatic ether ketone polymer in a strong acid, casting the solution, then precipitating the polymer by treating a film of the solution, in the required shape, with a non-solvent. Examples of strong acids suitable as solvents are methanesulphonic acid, fluoroalkane sulphonic acids, liquid hydrogen fluoride and sulphuric acid. Examples of suitable non-solvents are acetic acid, dilute sulphuric acid, water, methanol and ethanol.

FIG. 6 of EP 382356A is a photomicrograph of a membrane produced. It shows a region of very large "finger" voids, beneath a region of cellular voids (a so-called "sponge" structure). Such finger voids are very undesirable for gas separation uses.

The membranes produced by the method of EP 382356A are apparently unsuitable for using as such, in gas separation. As already noted it is stated that they could be used for this purpose, but in composite membranes. Example 44 describes the production of a gas separation membrane. An aromatic polyether ketone membrane is made by the method described above and is then brush coated with liquid silicone rubber, and the silicone cured for 16 hours at room temperature.

In EP 499381A similar technology is described, with the difference that the hollow fibre membrane produced may be drawn. This is said to yield the benefit that during filtration the flux through the membrane is increased but the molecular weight cut-off is unchanged.

Gas separation is an important field, but the technology of EP 382356A and EP 499381A appears unpromising for this purpose, in that the membranes they disclose require an additional coating step, before they can be used for gas separation. Not only does this additional step mean additional manufacturing complexity and additional cost, it also means that the membrane has two distinct materials, each with different diffusion constants for the gases being separated. This is an undesirable situation.

It has now been discovered, surprisingly, that the general method described in EP 382356A and EP 499381A may, in fact, be a useful starting point for the more effective manufacture of membranes, with properties making them suitable for use as gas separation membranes.

In accordance with a first aspect of the present invention there is provided a method of making a membrane of sheet or hollow fibre form, the membrane comprising an aromatic ether ketone polymer, the method comprising the steps of:
a) preparing a solution of the polymer in a solvent which is chemically inert to the polymer, the concentration of the polymer in the solution being at least 12%;
b) forming a film of the solution in sheet or hollow fibre form; and
c) contacting the film with sulphuric acid of concentration in the range 50-80%, thereby precipitating the membrane of said polymer.

In accordance with a second aspect of the present invention there is provided a method of making a membrane of sheet or hollow fibre form, the membrane comprising an aromatic ether ketone polymer, the method comprising the steps of:
a) preparing a solution of the polymer in a solvent which is chemically inert to the polymer;
b) forming a film of the solution in sheet or hollow fibre form; and
c) contacting the film with a non-solvent, thereby precipitating the membrane of said polymer, the interval between the addition of the non-solvent and the completion of the precipitation being at least 5 minutes, preferably at least 10 minutes.

In accordance with a third aspect of the present invention there is provided a method of making a membrane of sheet or hollow fibre form, the membrane comprising an aromatic ether ketone polymer, the method comprising the steps of:
a) preparing a solution of the polymer in a solvent which is chemically inert to the polymer;
b) forming a film of the solution in sheet or hollow fibre form; and
c) contacting the film with a non-solvent, thereby precipitating the membrane of said polymer;

wherein the solvent and non-solvent are selected such that when they are mixed the temperature rises by not more than 30° C. (when tested as described hereinafter).

The method of the second aspect may be used together with the method of the first aspect.

The method of the second aspect may be used in conjunction with the method of the third aspect.

The method of the first aspect may be used in conjunction with the method of the third aspect.

The methods of the first, second and third aspects may be used together.

The following definitions of preferred features and conditions may be read in conjunction with the first and/or second and/or third aspect(s) of the invention.

Preferably the polymer comprises an at least partially crystalline aromatic ether ketone polymer.

By partially crystalline we mean that the level of crystallinity is at least about 5%, preferably at least 10%. Such crystallinity is measured by wide angle X-ray diffraction as described by Blundell and Osborn (Polymer 24, 953, 1983).

By "aromatic ether ketone polymer" we mean a polymer in which inter-ring ether linkages and inter-ring ketone linkages together provide at least a major portion of the linkages between aromatic units in the polymer backbone. We do not exclude the possibility that a portion of the aromatic rings may be replaced by heterocyclic rings, for example pyridine.

As examples of aromatic ether ketone polymers of which the membrane according to the present invention may be comprised may be mentioned inter alia the polymers and copolymers illustrated in FIGS. 1 to 4.

FIG. 2 illustrates polymer chains in which a portion of the aromatic rings are joined by direct links (VII-IX) or are bicyclic ring (X);

FIG. 3 illustrates copolymer units bearing intercyclic —$SO_2$— bonds (XI-XII);

FIG. 4 illustrates certain copolymers containing ketone and ether links (XV) or in addition, a mixture of biphenyl and sulphone linkages (XIV and XVI).

Figure 1:
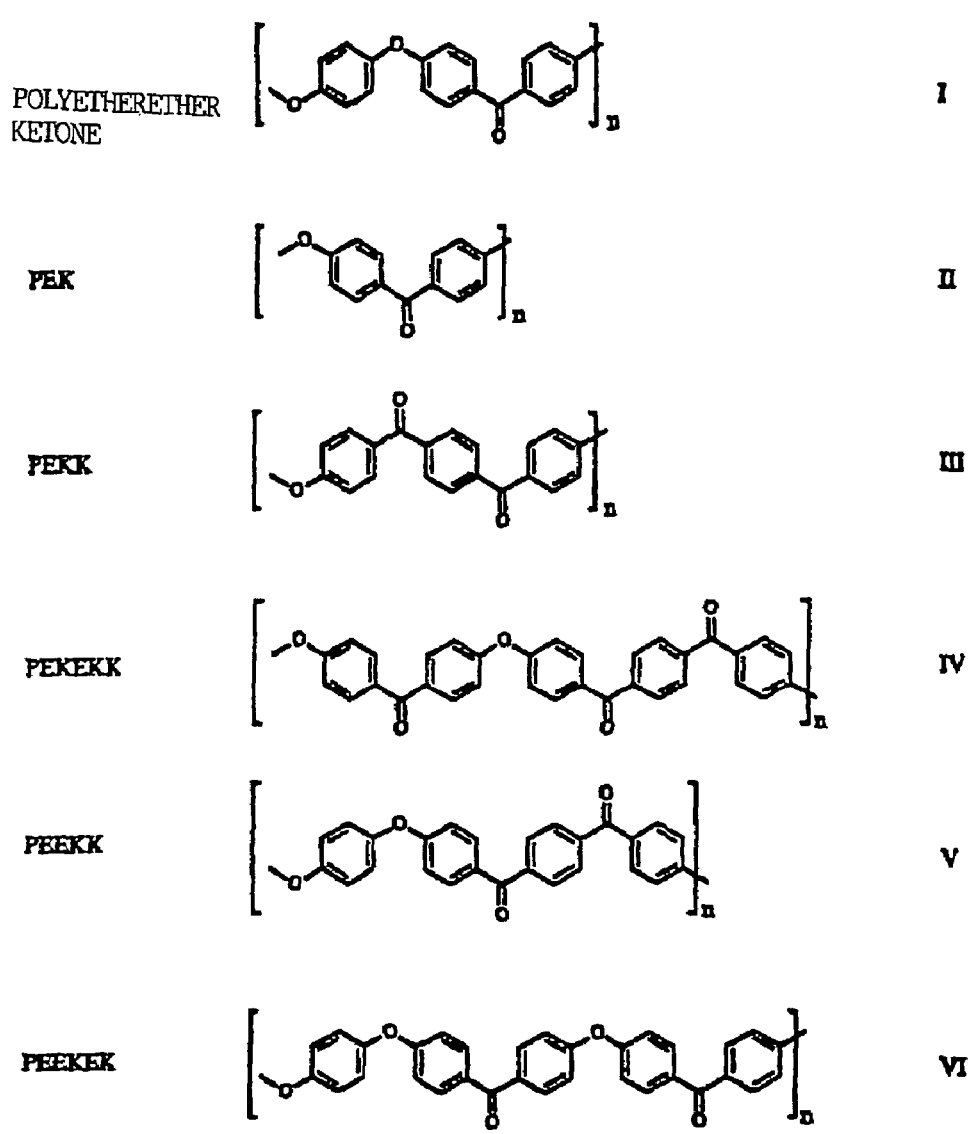
FIG. 1 illustrates polymer chains in which the aromatic rings are joined by ether or ketone bonds (I-VI)
Figure 5:
Figure 6:
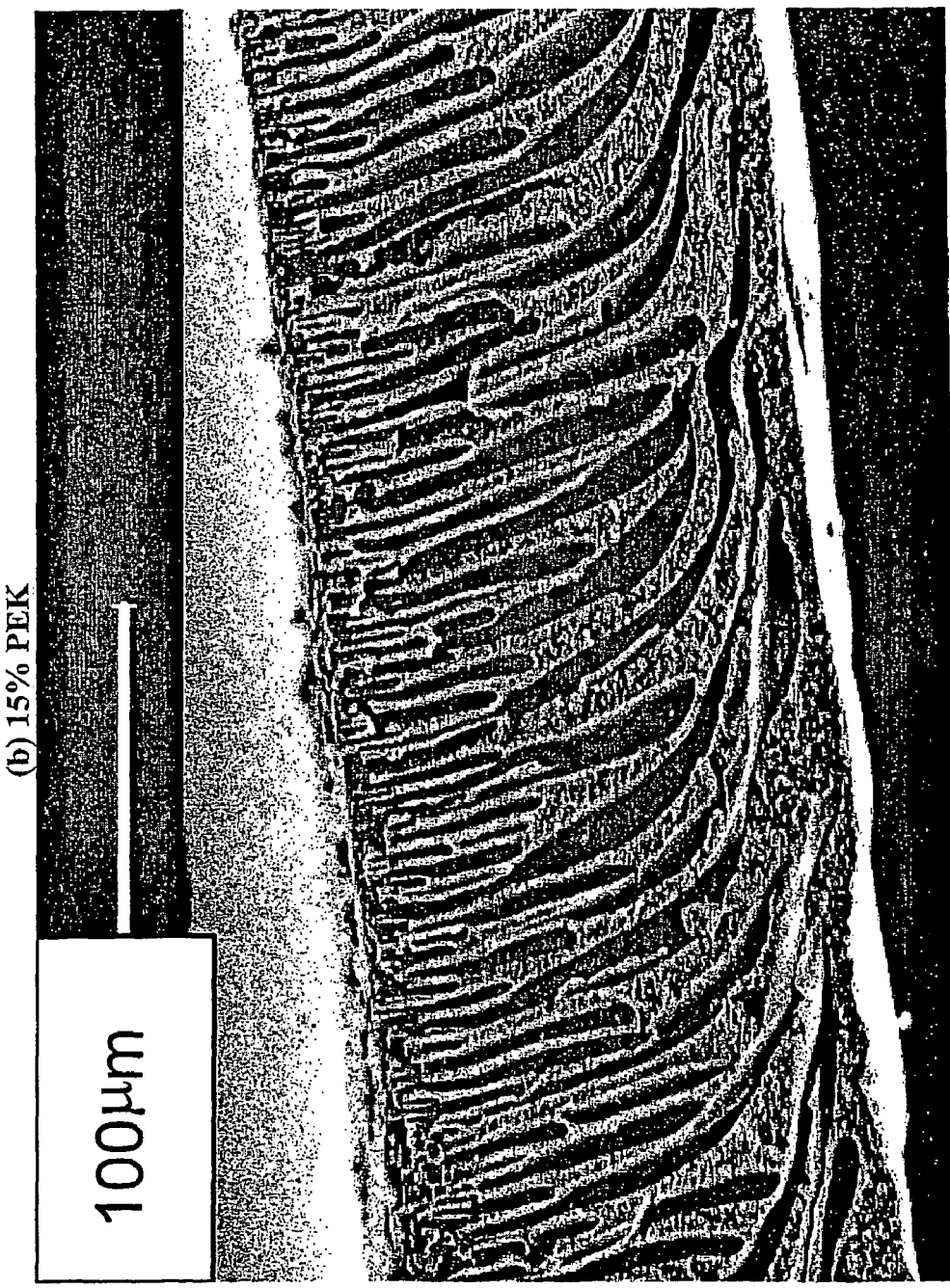

Some polymer types are hereinafter referred to for convenience by the trivial name appended thereto in the drawings.

It will be appreciated that in FIGS. 1-4,

E represents an ether linkage;
K represents a ketone linkage;
D represents a direct linkage;
m represents a meta substituted aromatic ring;
N represents a naphthalene ring; and
S represents a sulphone linkage except where it is used as a prefix to the polymer trivial name where it represents "sulphonated".

We do not exclude the possibility that at least a portion of the ether linkages in the polymers illustrated in FIGS. 1-4 may be replaced by thioether linkages.

The preparation of polymers illustrated in certain figures of the drawings are described in inter alia the Journal of Macromolecular Science, Review of Macromolecular Chem. Phys., (27 (2), 313-341, 1987 (General Formulae I-VIII); European patent specification No. 0323076 (General Formula IX); Polymer 1984, vol. 25 (August), 1151 (General Formula X); EPA 0194062 (General Formula XIV) and British patent application BPA 89 10549 (General Formula XVI).

Whereas the polymer is preferably a homopolymer, eg polyetheretherketone or PEK we do not exclude the possibility that it may be a copolymer eg polyetheretherketone/PEK, polyetheretherketone/PES, PEK/PES, polyetheretherketone/PEES, wherein the copolymer units are represented by the General Formula XI-XII in the drawings appended hereto.

Preferred polymers for use in the present invention are those which are resistant to sulphonation in concentrated sulphuric acid, notably PEKK, PEKEKK and, especially PEK.

It will be appreciated that when a copolymer is used the nature and molar percentage of the "comonomer" will be chosen such that it does not unduly decrease the crystallinity of the polyetherketone component of the copolymer and that the inter-aromatic links therein are non-hydrolysable under the conditions of preparation and expected use of the membrane. As examples of comonomer units may be mentioned inter alia aromatic sulphones, sulphides, and biaryls.

Preferably the solvent is a strong acid. Preferably it is a substantially non-sulphonating reagent towards the aromatic ether ketone polymer. For example, where the aromatic ether ketone polymer is polyetheretherketone (or another aromatic ether ketone polymer having O-Ph-O— or other electron-rich readily sulphonatable units) the strong acid is typically a sulphonic acid, for example methanesulphonic acid, rather than sulphuric acid.

The solution is formed by dissolving the polymer, typically in particulate form, in the strong acid under an inert atmosphere, at a temperature and timespan sufficient to completely dissolve the polymer. Preferably no pore-forming agent is present.

A sheet membrane is typically formed by casting the polymer solution as a thin film, typically of thickness between 20 and 500 µm, onto a suitable substrate which is not attacked by the solution. The membrane can be supported by a porous fabric or film eg polyethylene, polypropylene, polyetheretherketone, polyester, PTFE or carbon fibre. Alternatively, the membrane can be unsupported in which case the film would be cast onto a plane non-porous surface, eg a band of stainless steel, PTFE or polypropylene or a sheet of glass. Of course, the skilled person must select a material which is not degraded by the solution being cast onto it.

The polymer is then precipitated by treating the shaped solution with the non-solvent under suitable conditions. For example it may be immersed in non-solvent liquid in a gelation bath, or non-solvent vapour may be allowed or caused to diffuse into it.

A fibre capillary membrane may be formed by extruding the polymer solution through the outer annulus of a coaxial die. Through the inner nozzle there is a flow of suitable fluid, eg an inert gas or liquid, which is a non-solvent for the polymer. Detail on the preparation of such membranes is provided in EP 0499 381 A1 and the content thereof is incorporated herein by reference.

The precipitated membrane is then allowed to remain in contact with the non-solvent for a time sufficient to allow substantially gelation of the polymer, then removed from the non-solvent.

The residual solvent/non-solvent is removed from the membrane by treatment with an aqueous medium, eg water or an aqueous base, at an appropriate temperature, eg between room temperature and the boiling point of water. Further treatment with an organic medium may be necessary to reduce the amount of acid present in the membrane further.

The membrane may be subjected to a subsequent treatment to enhance crystallinity. As examples of such treatment may be mentioned inter alia heating the membrane, preferably in a substantially dry state, and preferably above the Tg of the polymer, under an inert atmosphere; and treatment with a polar aprotic solvent, for example acetone, dimethyacetamide (DMA), dimethylformamide (DMF), tetrahydrofuran (THF) and dichloromethane. After use of a crystallinity increasing solvent, especially acetone, dichloromethane or tetrahydrofuran, there is preferably a further step which involves removal of the solvent, for example by evaporation.

Preferably the solvent is substantially water-free although we do not exclude the possibility that it may contain a small amount, for example up to 10%, of water.

It will be appreciated that the solvent will be chosen in the light of the structure of the polymer. For example, it should not react chemically with the polymer or unduly reduce the crystallinity thereof, on precipitation. For example, whereas 98% sulphuric acid reacts with polyetheretherketone and should not be used therewith, it can advantageously be used with polyetherketone (PEK) in the process according to the present invention. The solvent should be a good solvent for the polymer but inert to it. After membrane formation it should be readily extractable therefrom.

We do not exclude the possibility that a preferred strong acid solvent may be a mixture of acids, eg sulphuric acid and acetic acid. It will be appreciated that where one of the acids in the mixture is a non-solvent for the polymer the concentration thereof will be insufficient to inhibit solvation of the polymer in the mixture. One possible strong acid solvent is a mixture of sulphuric acid and acetic acid, the concentration of acetic acid typically being less than 15% w/w.

As examples of strong acids for use in the process of the present invention may be mentioned inter alia sulphuric acid, liquid hydrogen fluoride, methane sulphonic acid, fluoromethane sulphonic acid, and di- and tri-fluoromethane sulphonic acid.

It will be appreciated that the skilled person will take appropriate precautions when using any of the above acids.

We do not exclude the possibility that a further solvent may be used in combination with the strong acid, with the proviso that it does not unduly impair the solvent power of the strong acid or unduly react with the polymer in the presence of the strong acid.

As typical examples of such further solvents may be mentioned inter alia liquid sulphur dioxide, 1,2,4-trichlorobenzene, 1,2-dichloroethane, dichloromethane, dichloroacetic acid and trifluoroacetic acid.

Typically the concentration of the polymer in the solvent is at least 12%, preferably at least 14%, most preferably at least 16%. The upper limit may be determined empirically. It may, for example, be determined by viscosity considerations or by the ultimate upper limit of the concentration of the polymer in the solvent. However in typical practical examples the concentration is up to 40%, preferably up to 30%, most preferably up to 25%.

As examples of non-solvents used in the process of the present invention may be mentioned inter alia polyhydric alcohols, concentrated acetic acid, and somewhat dilute sulphuric acid. The non-solvent used in the process of the present invention may be a single component or a mixture. However in preferred methods there is a single solvent.

A preferred solvent, when the polymer is resistant to sulphonation by it, is concentrated sulphuric acid, preferably of at least 96% concentration.

When concentrated acetic acid is used it is suitably of concentration at least 80%, preferably at least 90%.

When a polyhydric alcohol is used in the present invention it is preferably used neat.

When somewhat dilute sulphuric acid is used as a non-solvent in the present invention it is suitably of concentration at least 40%, preferably at least 50%, more preferably at least 55%, and most preferably at least 60%. Preferably dilute sulphuric acid is of concentration not exceeding 80%, and most preferably not exceeding 72%.

Preferably the mixing of the non-solvent with the solution is accompanied by a temperature rise not exceeding 27° C., and preferably not exceeding 25° C. (when tested as hereinafter described).

A preferred method of the invention is for making a sheet or hollow fibre membrane of an at least partially crystalline aromatic ether ketone polymer comprising O-phenyl-C(O)— units and substantially free of —O-phenyl-O— or other electron-rich readily sulphonatable units, the method comprising the steps of a) preparing a solution of the polymer in concentrated sulphuric acid of concentration at least 90%, the concentration of the polymer in the solution being in the range 14-30%, preferably 16-25%;

b) forming a film of the solution in sheet or hollow fibre shape; and c) contacting the film with sulphuric acid of strength in the range 50-80%, preferably 55-72%, thereby precipitating the sheet or hollow membrane of the polymer.

The measures described herein are significant in promoting an improved membrane, suitable for use in gas separation.

Preferred membranes produced by the method of the present invention have, in cross-section, a surface layer, preferably substantially void-free, and a base layer which is wholly or predominantly of cellular structure, and substantially free of, or with no, finger voids. The measures of the present invention seek to maximise the cellular or "sponge" structure and minimise, or preferably eliminate, the finger voids. Where there are voids present (other than the cellular microvoids of the "sponge" structure) they suitably do not compromise gas separation performance.

In accordance with a fourth aspect of the present invention there is provided a membrane of a partially crystalline aromatic ether ketone polymer, the membrane being of sheet or hollow fibre form, the membrane comprising, in cross-section, a surface layer, preferably substantially void-free, and a base layer which is wholly or predominantly of "sponge" cellular void structure. Preferably such a membrane has substantially no finger voids. Preferably it contains substantially no large voids which extend within the base layer as far as the surface layer. Preferably it contains no large voids which extend within the base layer from the under-surface of the base layer (that is, opposite to the surface layer). It is especially preferred that it contains no large through-voids which extend through the entire thickness of the base layer. It is especially preferred that it has substantially no finger voids.

Suitably, in use, the membrane of the fourth aspect of the present invention is used as a gas separator as such, without being coated by or laminated to a different material. Preferably the membrane itself is able to selectively pass gas A, of a gas mixture A+B.

In accordance with a fifth aspect of the present invention there is provided gas separation apparatus comprising a membrane made by a method of the first, second or third aspect of the present invention, or comprising a membrane of the fourth aspect.

In a preferred embodiment there is provided a method of preparing a polyetherketone membrane, preferably for gas separation, the method including the steps of:

preparing a solution (preferably of concentration between 15 and 20%) of polyetherketone in concentrated sulphuric acid (preferably 98% $H_2SO_4$);

casting the solution;

causing phase inversion by use of a non-solvent selected from diluted sulphuric acid, glycerol and acetic acid. A preferred sulphuric acid concentration is 50-60% $H_2SO_4$; a preferred glycerol concentration is 30-40% glycerol; and a preferred acetic acid concentration is 70-90% acetic acid.

Figure 9:
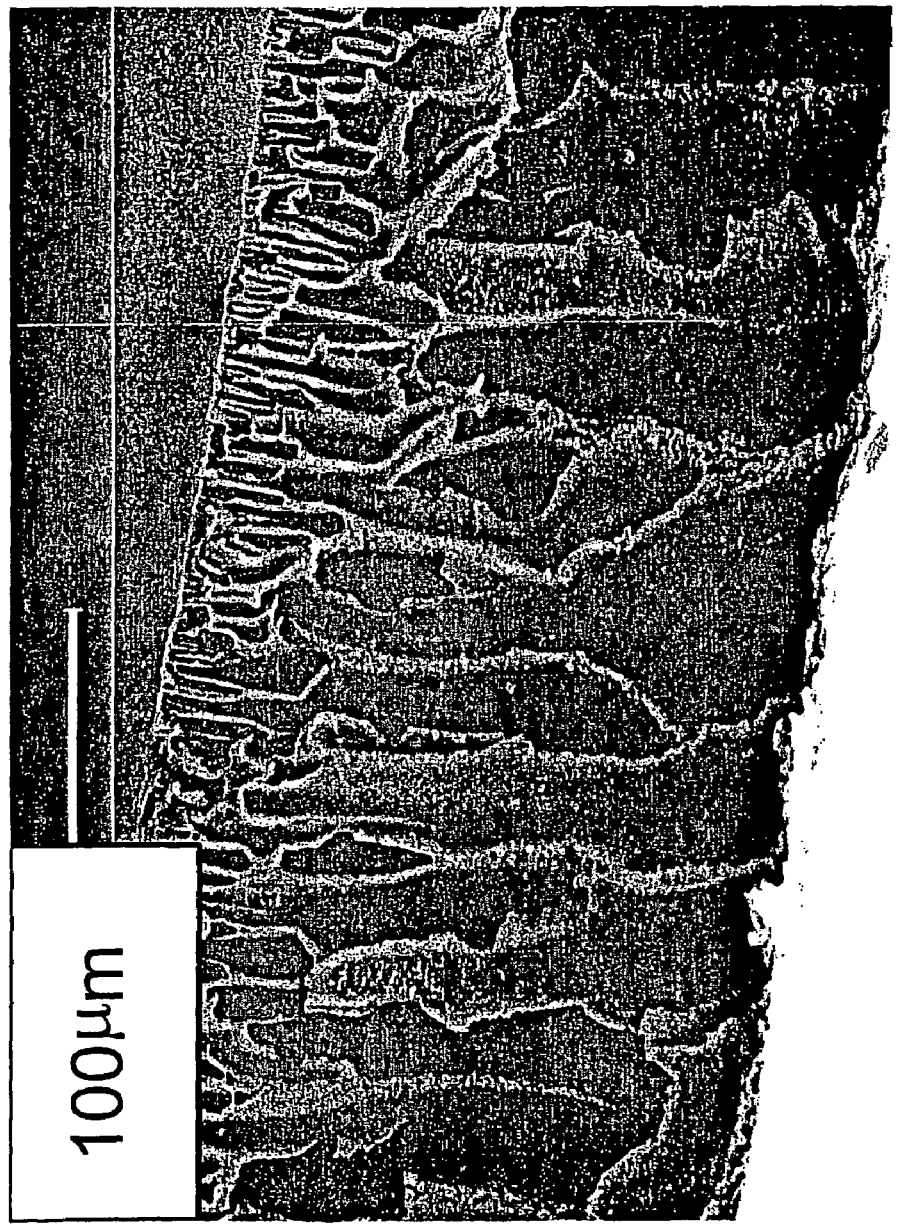
Figure 10:
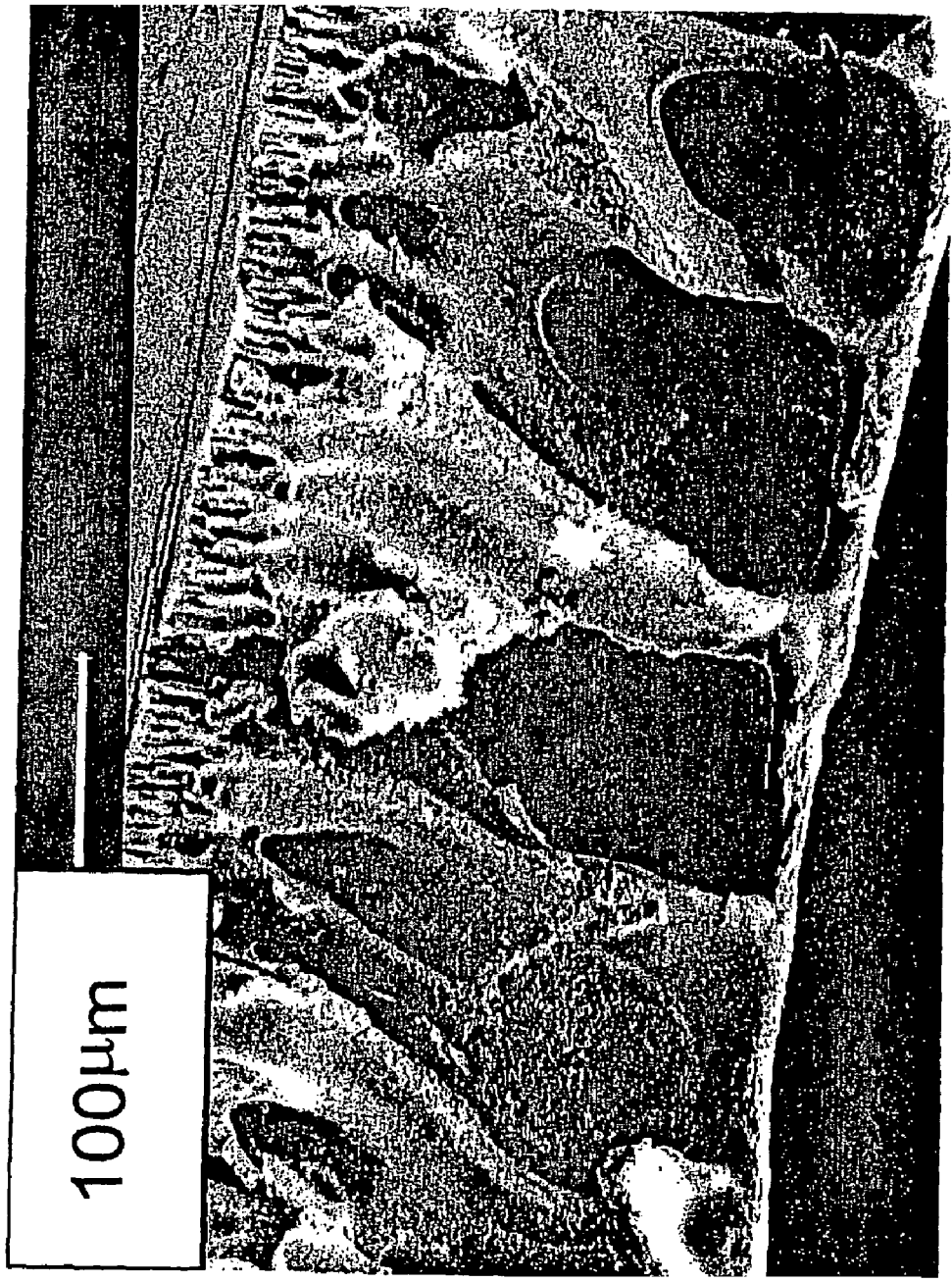
Figure 11:
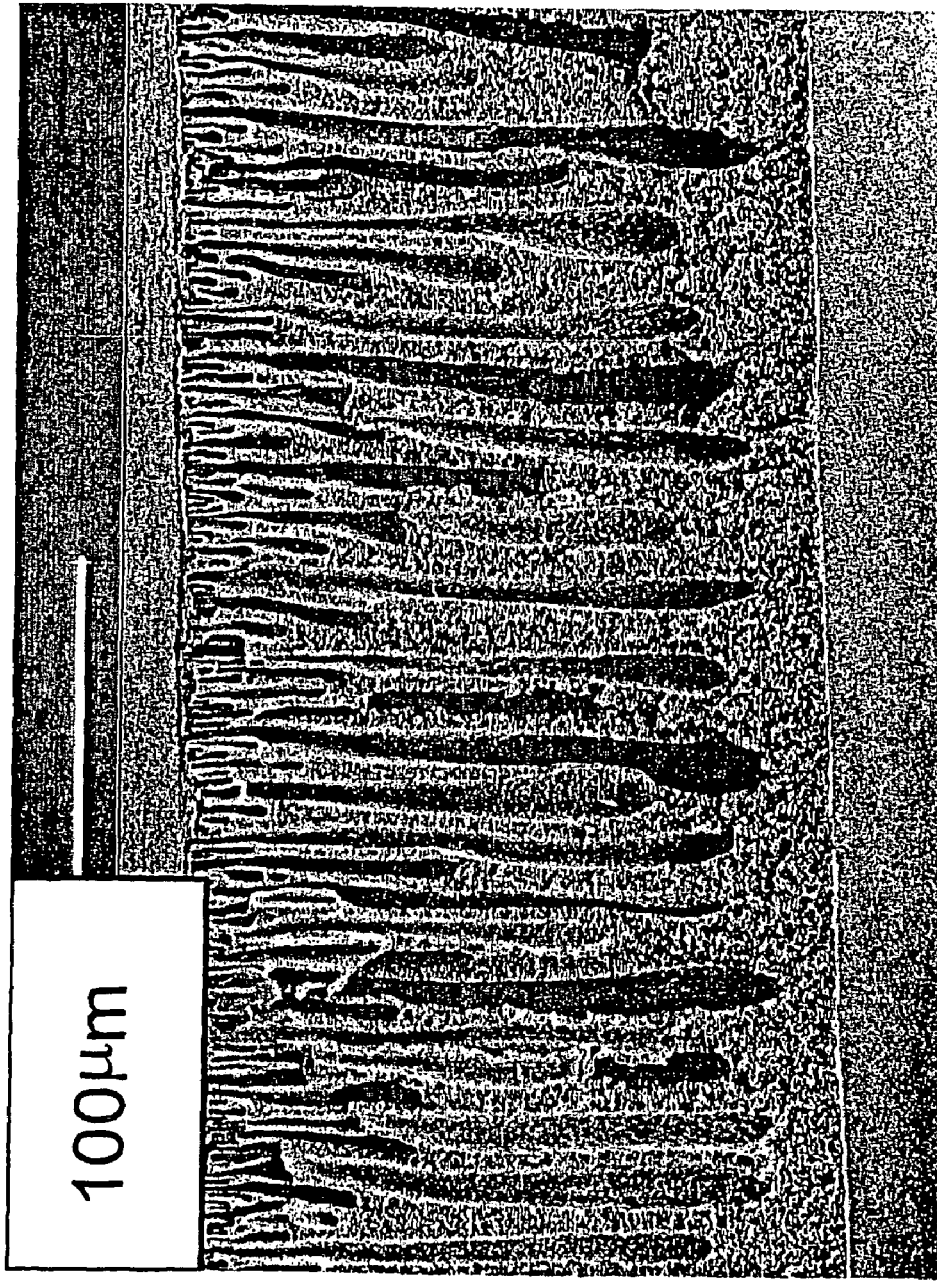
Figure 12:
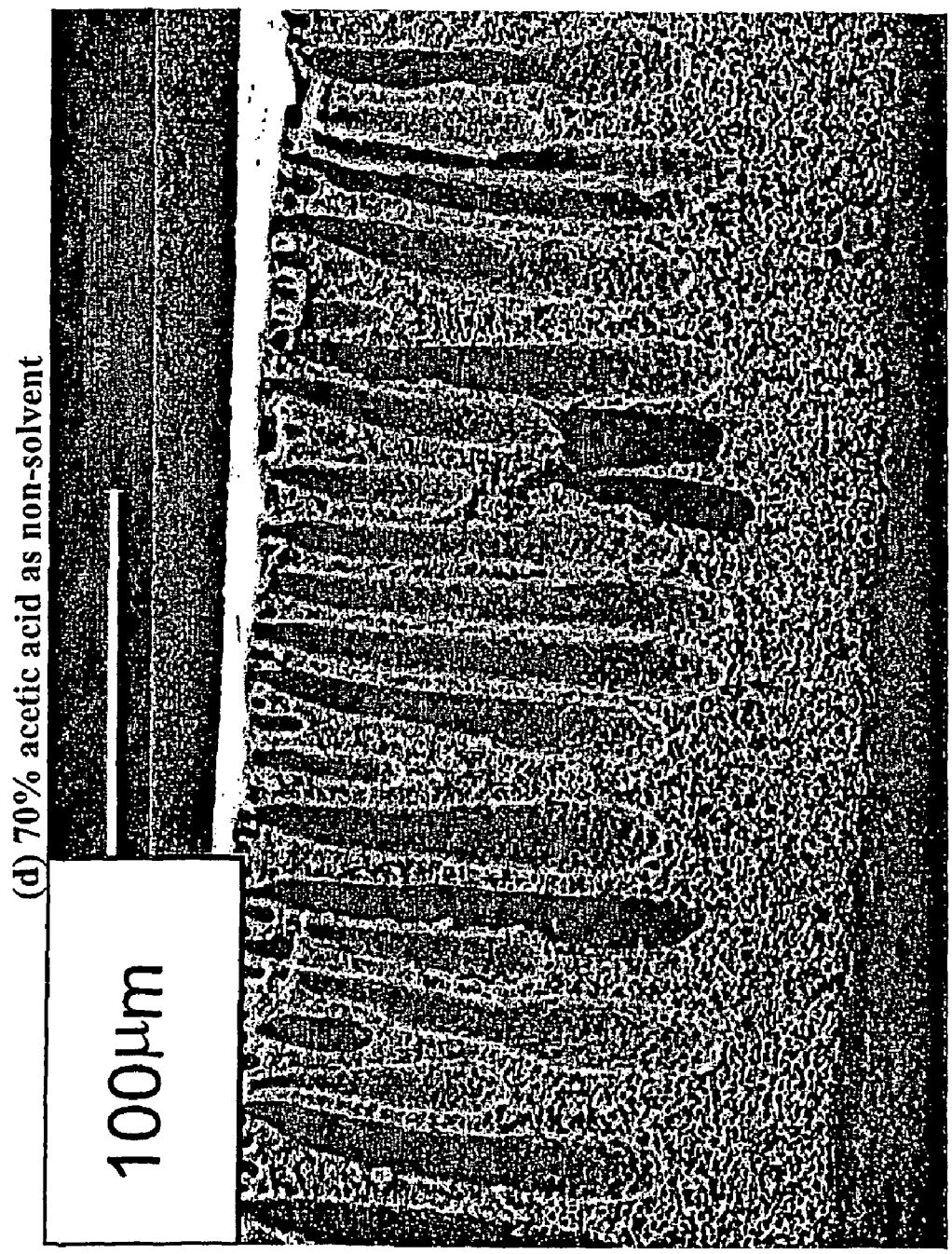
Figure 13:
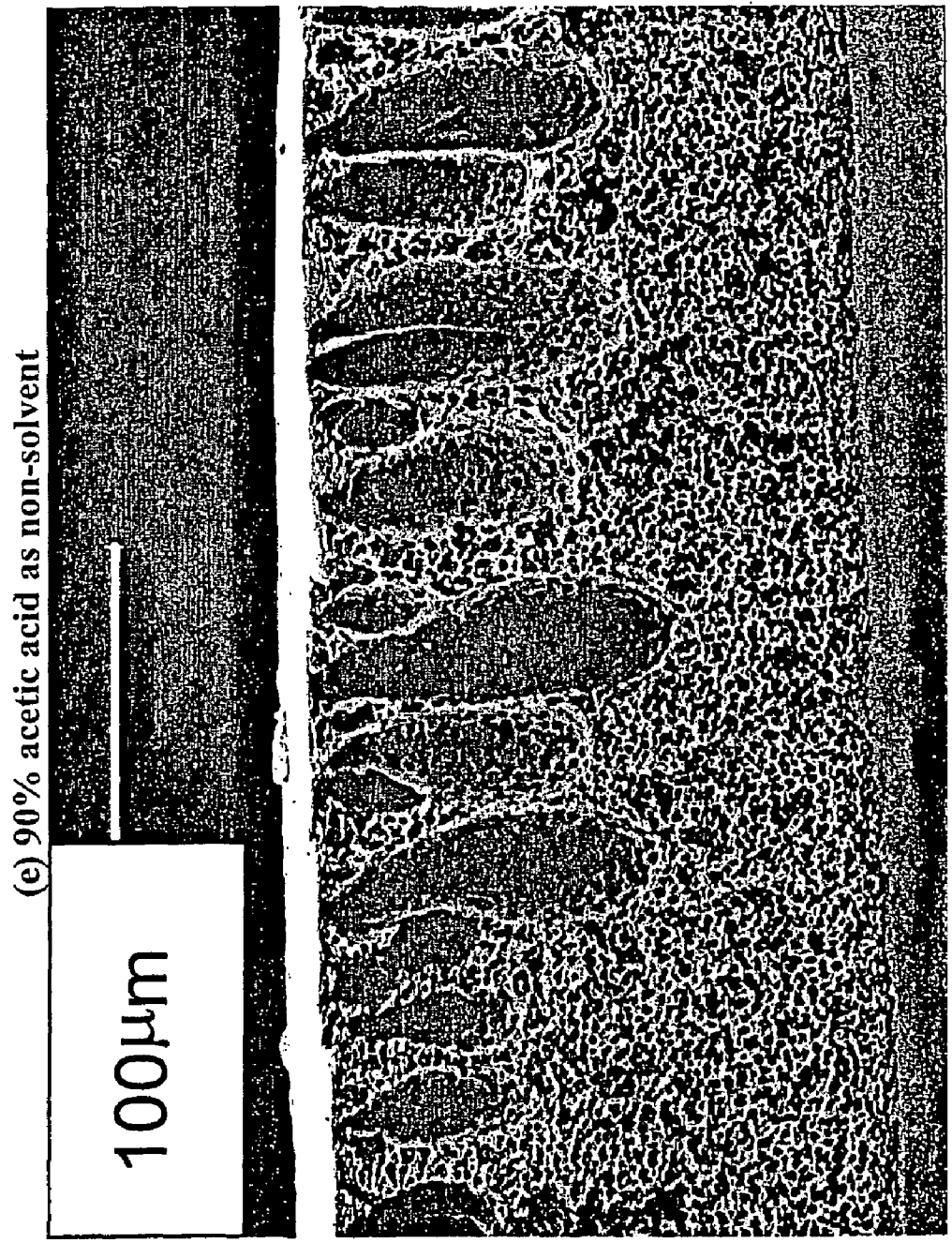
Figure 14:
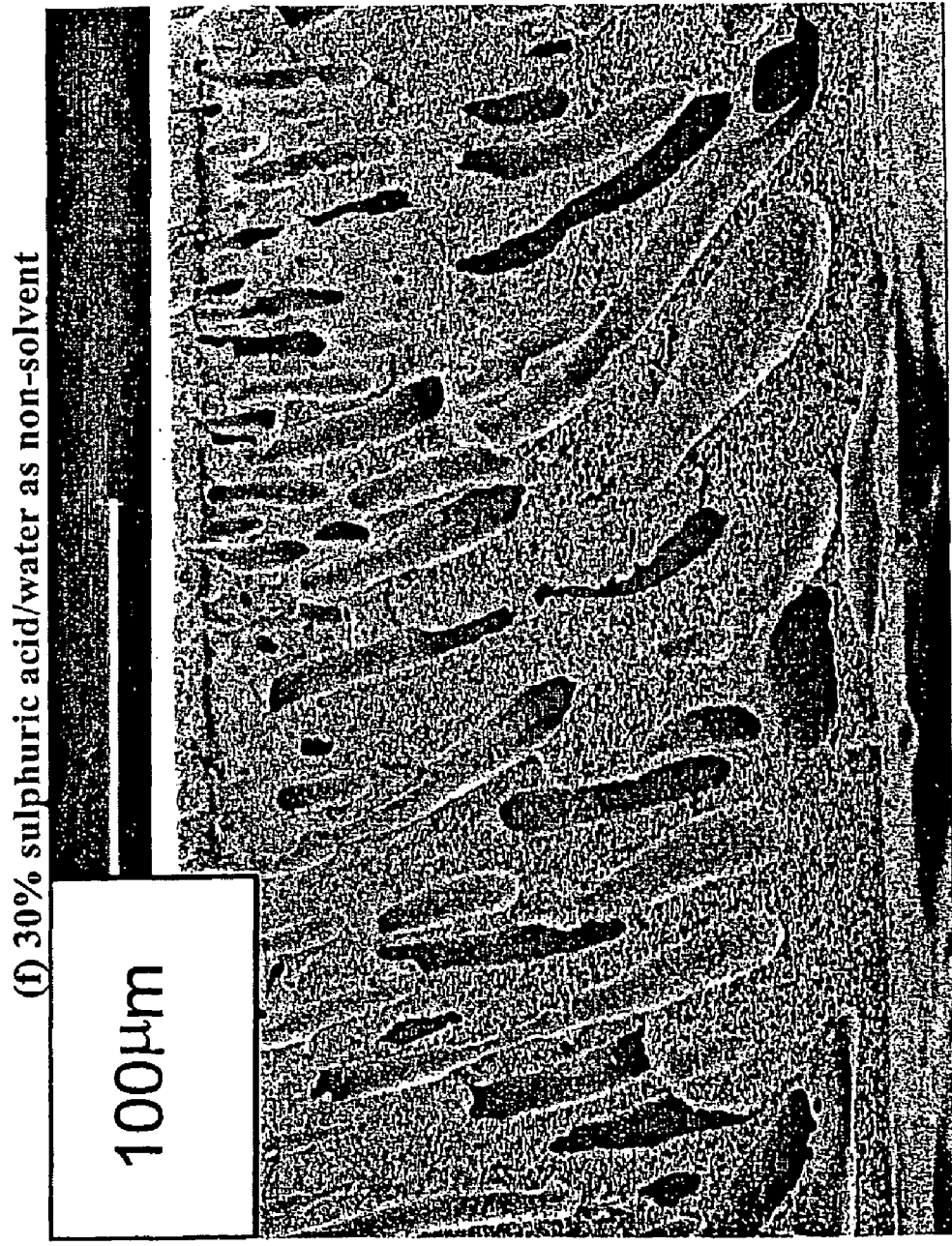
Figure 15:
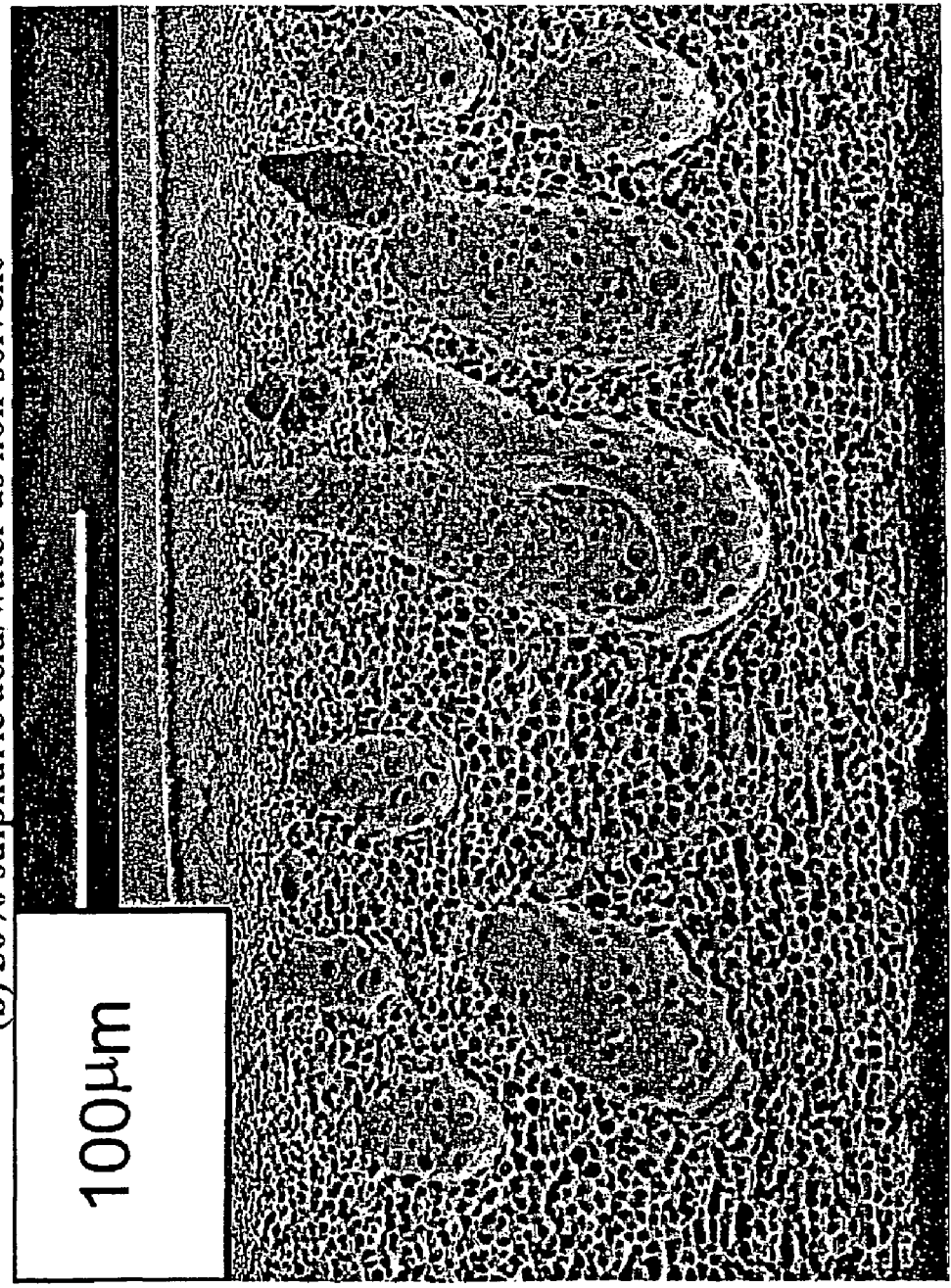
Figure 16:
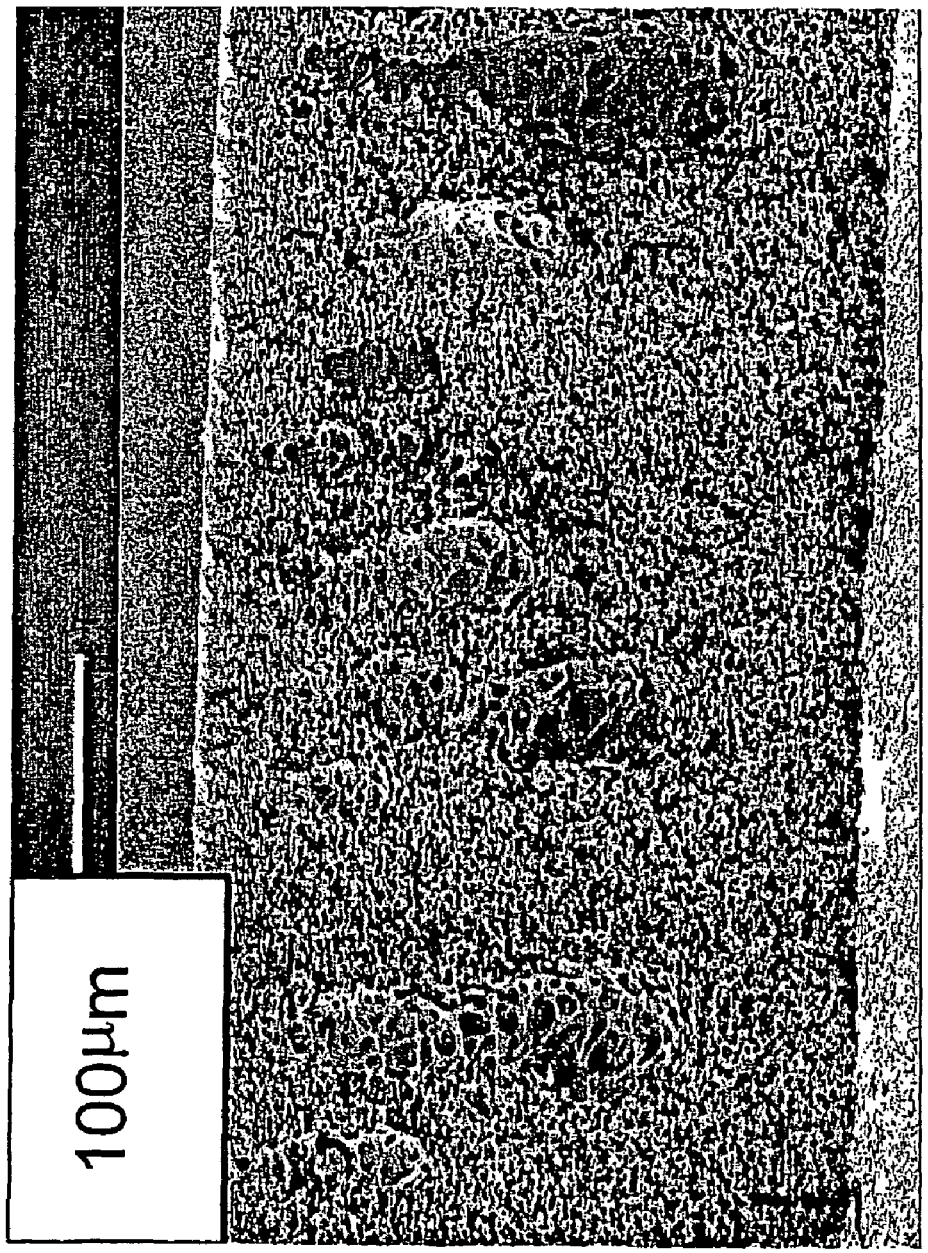
Figure 17:
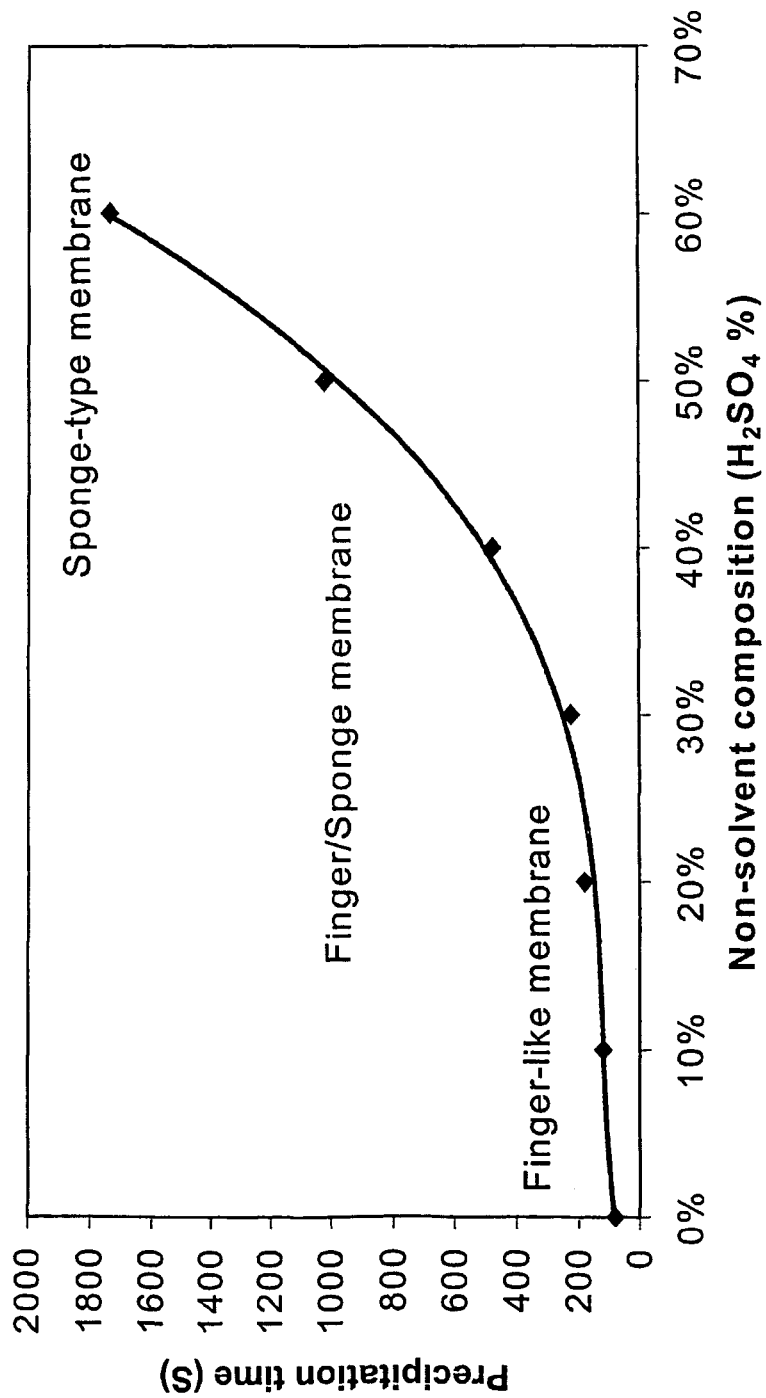
Figure 18:
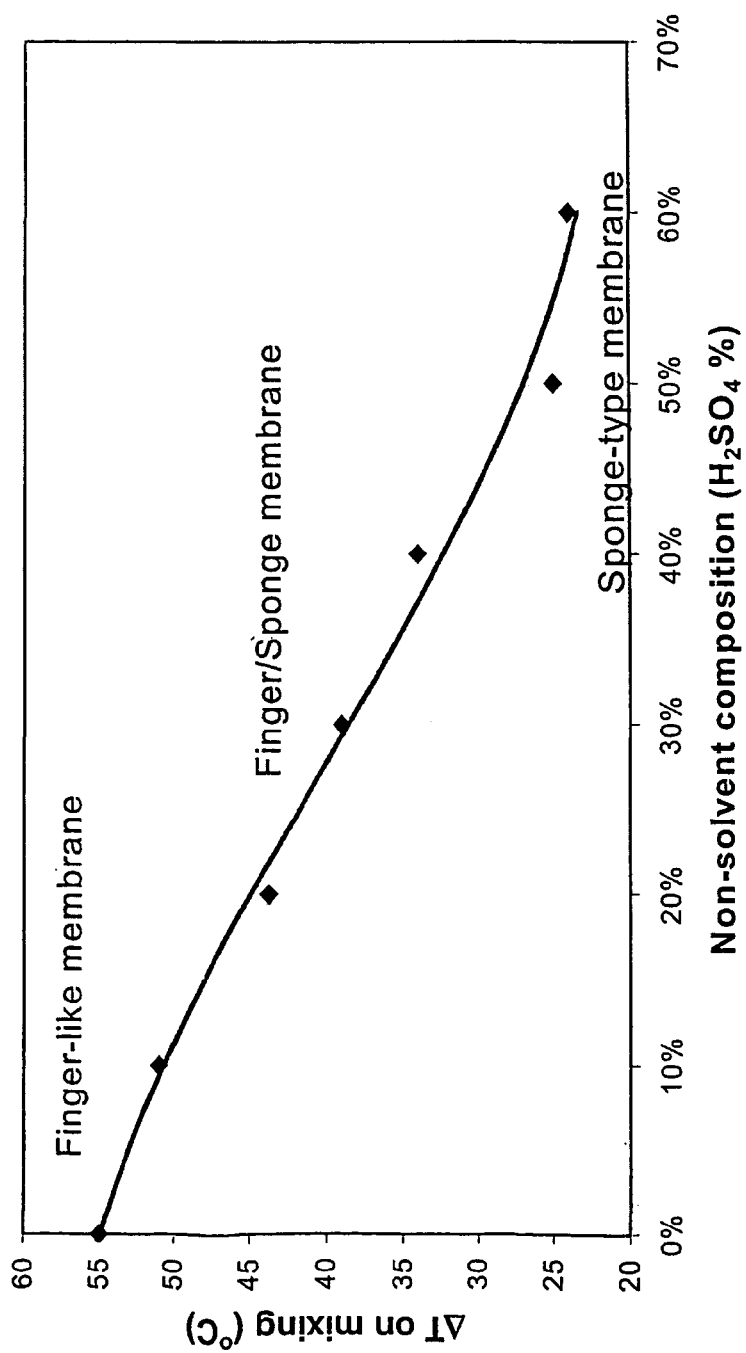
Figure 19:
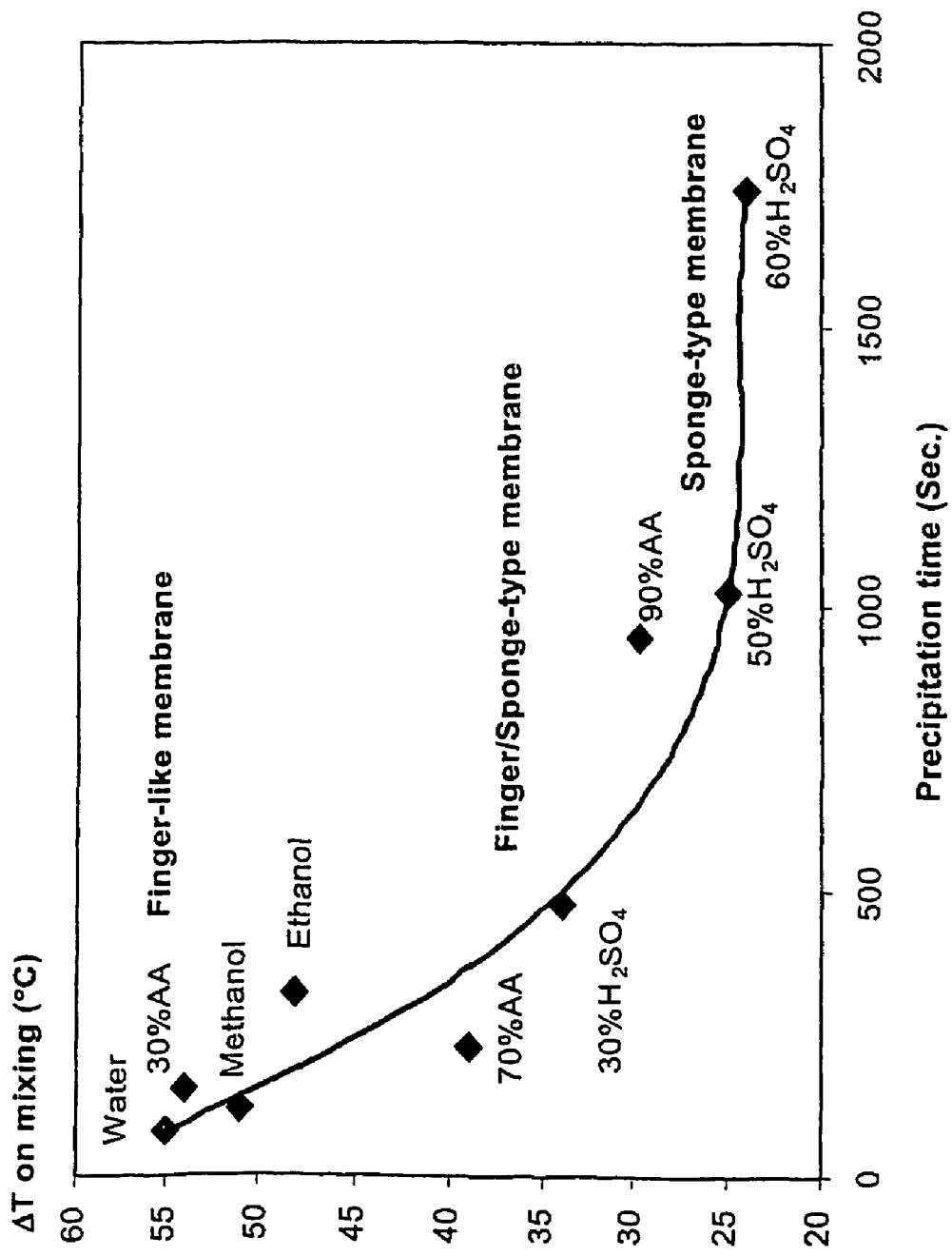

The invention is further illustrated by reference to the following Examples, in conjunction with the drawings, in which:

FIGS. 1-4 show structures of aromatic polyether ketones;

FIGS. 5-8 are photomicrographs of PEK membranes prepared from polymer solutions of different strengths, with water as non-solvent;

FIGS. 9 and 10 are photomicrographs of PEK membranes prepared respectively using methanol and ethanol as non-solvents;

FIGS. 11-13 are photomicrographs of PEK membranes prepared using acetic acid of different concentrations, as non-solvent;

FIGS. 14-16 are photomicrographs of PEK membranes prepared using sulphuric acid of different concentrations, as non-solvent;

FIGS. 17 and 18 are graphs showing the relationship between concentration of sulphuric acid used as non-solvent, and the precipitation time and the temperature increase on mixing; and FIG. 19 is a graph summarising the results obtained using different non-solvents.

Membrane Manufacture

The polymer used for membrane manufacture was polyetherketone (PEK), grade, MV0.392, from Victrex, of Blackpool, UK. The polymer was dried for 24 hours at 100° C. under vacuum prior to dissolution. The solvent (98% sulphuric acid, A. R. grade) was first placed into a reactor vessel, and then heated to 50° C. in a water bath. The required amount of PEK polymer was then added to the solvent. The polymer solvent mixture was stirred between 300 to 500 rpm for about 5 hours until a viscous red solution of PEK in 98% sulphuric acid was obtained.

The film casting procedure was developed to evaluate particular combinations of polymer, solvent and non-solvent. The polymer solution was cast at room temperature on to a glass plate (70 mm×110 mm×4 mm) and a draw down technique was used to produce films of wet thickness 250 µm. After a few seconds, the plate was immersed in a vessel with the desired non-solvent. After the precipitation process the films separated from the glass plate and then they were removed from the vessel. The films were then placed in a water bath (in which the water was changed twice daily) and left for one week to remove any traces of residual solvent.

Precipitation Time

The term "precipitation time" was defined to describe qualitatively the phase inversion process. The precipitation time was recorded as the time period from when the nascent cast film (with wet thickness 250 µm) was immersed into the vessel, to when the membrane separated completely from the glass plate. In other words the shorter the "precipitation time", the more rapidly the polymer precipitates in the non-sol-vent and separates from the plate.

Determination of the $\Delta T$ of Mixing of Solvent and Non-Solvent Systems

A simple method was devised to determine the temperature rise on mixing the solvent and non-solvent system. The solvent (total 5 ml) was added at a rate of 1 ml/min via a burette into 20 ml of non-solvent (with slow stirring) at room temperature. After all the solvent had been added any temperature variation that accompanied the mixing of the solvent and non-solvent was measured using a thermometer to +/−0.5° C.

Examination of Membrane Morphology

The cross-sectional membrane morphologies were observed using Scanning Electron Microscopy (SEM) (Cambridge S360). The fracture surfaces were produced by breaking the membranes in liquid nitrogen and sputtered with gold.

Effect of Polymer Concentration on Membrane Structure

The scanning electron micrographs shown in FIGS. 5-8 are cross-sections of membranes produced from PEK polymer solutions in 98% sulphuric acid. In each case water (at 20° C.) was used as the non-solvent. It is clear that at different polymer concentrations, i.e., 10%, 15%, 18% and 20%, different morphologies are produced. In each case the top of the respective film, that is the side that was never in contact with the glass casting plate is at the top of micrograph.

Films cast from 10% PEK polymer solutions show large disruptive macro-voids (including finger voids) in the cross-section. Pores on the top surface of film were visible using the SEM. In addition to this, the thickness of the dense skin (the top separation layer) was very small and overall the structure would not provide sufficient self-supporting mechanical properties.

Films cast from 15% and 18% PEK show regular finger voids in the central part of cross-section. No pores on the top surface were visible using the SEM. It can be seen that a significant number of finger voids penetrate through the whole film and channels can be observed that lead from the top to the bottom of the membrane.

The films cast from 20% PEK solutions have a thick dense separating layer. Finger voids penetrated the whole length of the cross-section and these were observed to be narrower and more needle shaped than those film cast from lower polymer concentrations. A poorly developed cellular sponge structure was also observed.

The precipitation times for these membranes was as follows:
10% PEK: 32.9 seconds
15% PEK: 60.2 seconds
18% PEK: 80.2 seconds
20% PEK: 360 seconds Although none are of use in the present invention these experiments suggest that better results may be achieved with longer precipitation times.

Effect of Non-Solvents on Membrane Structure

The non-solvents used in phase inversion processes greatly affect the gas permeation properties of membranes. Studies of the PEK polymer/solvent/non-solvent system provided information for the choice of suitable non-solvents. Precipitation times corresponded to different liquid-liquid demixing processes and resulted in a variety of membrane structures.

In this study, water, methanol, ethanol, and weak acids were shown to act as non-solvents by precipitating 20% concentration PEK from 98% sulphuric acid. Using different kinds of non-solvent a variety of film morphologies were obtained as shown in FIGS. 9-13. Different morphological zones are apparent in the top skin and in the bottom membrane layers. Changing from water as non-solvent (FIG. 5) to one of high acetic acid concentration reduced the amount of finger voids in the structure. Acetic acid based coagulants aid in the formation of sponge-like structures and produce reasonable morphologies for gas separation. Table 1 below shows the membrane precipitation times and $\Delta T$ of mixing.

If methanol and ethanol were used as non-solvents they produced similar PEK film morphologies. These membranes have high void volumes and overall the structures are characterised by large macro-voids across the film sections. The final structures were similar to those of membranes cast from low polymer concentrations when water was used as the non-solvent, and are not of use.

TABLE 1

Non-solvents - precipitation time of 20% PEK in 98% sulphuric acid and $\Delta T$ on mixing

| Non-solvents | Precipitation time (sec.) | $\Delta T$ of mixing (° C.) |
|---|---|---|
| Water | 80 | 55 |
| Methanol | 120 | 51 |
| Ethanol | 278 | 47 |
| 30% Acetic acid | 150 | 53 |
| 70% Acetic acid | 220 | 39 |
| 90% Acetic acid | 966 | 30 |

Use of Sulphuric Acid as Non-Solvent

Figure 7:
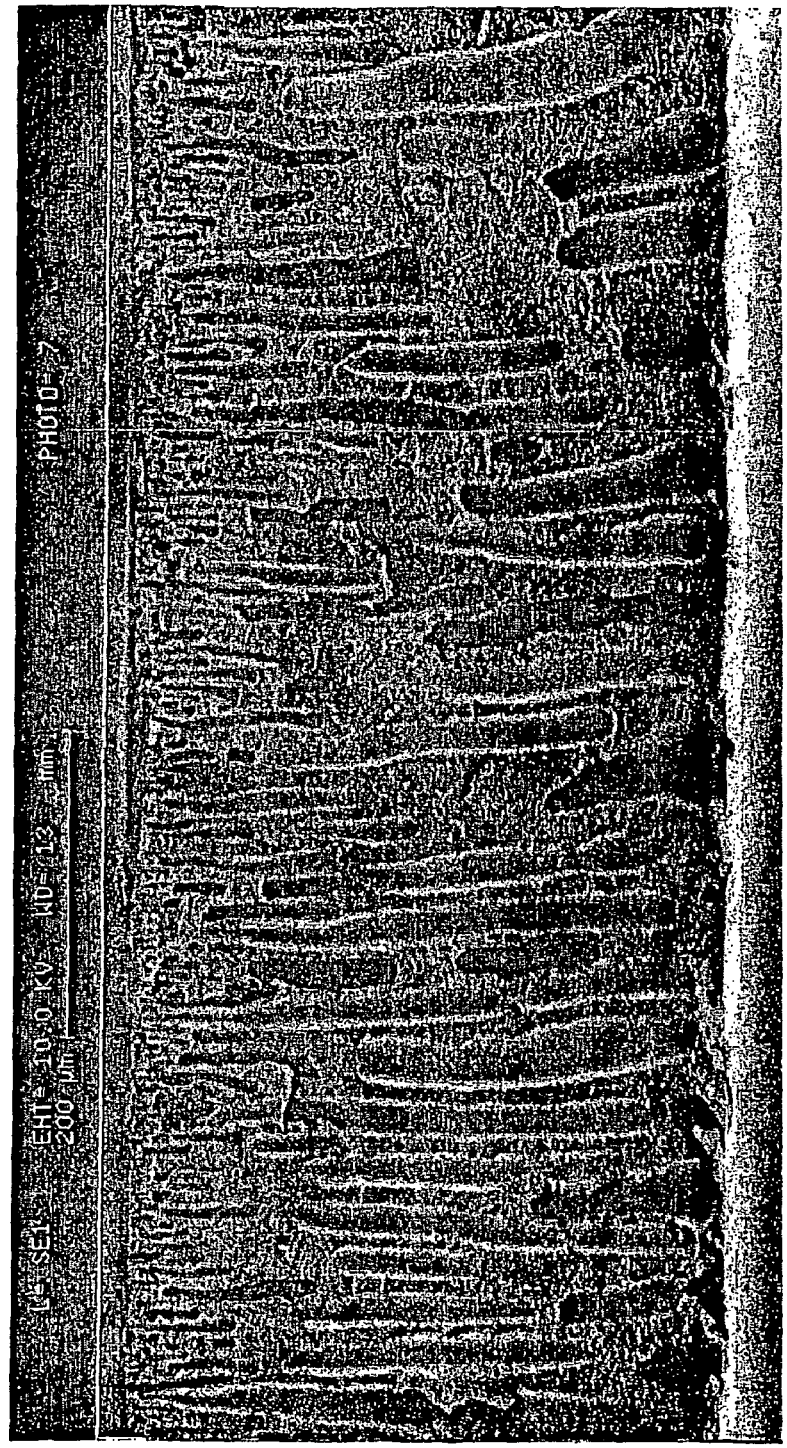
Figure 8:

In an attempt to obtain better sponge-like substructures in PEK membranes moderately dilute sulphuric acid was studied as a possible non-solvent. A number of solutions, 30%, 50% and 60% of sulphuric acid were used and membranes precipitated from films cast from 18% PEK in 98% sulphuric acid gave improved morphological structures as shown in FIG. 7.

Films cast using 30% sulphuric acid as the non-solvent exhibited undesirable finger voids (FIG. 14). Films cast using 50% and 60% sulphuric acid had well-developed interconnected cellular structures that ran from the top to the bottom of the membrane (FIGS. 15, 16). These structures were not entirely macrovoid-free, but a highly reduced number of macrovoids were observed, and they were of rounded "teardrop" shape, rather than being of finger shape. These were the most favourable morphologies obtained, for gas separation.

The more concentrated-sulphuric acid materials thus gave better membrane morphology. They also gave longer precipitation times and lower ΔT on mixing, as can be seen in FIGS. 17 and 18 respectively.

Conclusion and Summary

Non-solvents which gave lower ΔT values and longer precipitation times gave better membranes for gas separation. The relationship between temperature rise (heat of mixing solvent and non-solvent), precipitation time and membrane structure is shown in the overall summary graph, FIG. 19. Decreased heat of mixing appears to favour desirable sponge-type cellular structures whilst high heat of mixing appears to favour undesirable finger void structures.

In this specification all % concentration values are expressed as wt/wt (for example 50% sulphuric acid means 50% sulphuric acid by weight, per weight of sulphuric acid and water).

The invention claimed is:

1. A method of making a membrane of sheet or hollow fibre form, the membrane comprising an aromatic ether ketone polymer comprising O-phenyl-C(O)- units substantially free of —O-phenyl-O— or other electron rich readily sulphonatable units, the method comprising the steps of:
   a) preparing a solution of the polymer in a solvent which is chemically inert to the polymer, the concentration of the polymer in the solution being in the range 15-20%;
   b) forming a film of the solution in sheet or hollow fibre form; and
   c) contacting the film with sulphuric acid of concentration in the range 55-72%, thereby precipitating the membrane of said polymer.

2. A method according to claim 1, wherein the film is contacted with sulphuric acid thereby precipitating the membrane of said polymer and the interval between the addition of the sulphuric acid and the completion of the precipitation is at least 5 minutes.

3. A method according to claim 1, wherein the solvent and sulphuric acid are selected such that when they are mixed the temperature rises by not more than 30° C.

4. A method according to claim 1, wherein said aromatic ether ketone polymer is partially crystalline.

5. A method according to claim 1, which comprises a polyetherketone homopolymer or copolymer.

6. A method according to claim 1, wherein the solvent used in the preparation of said solution of the polymer is a strong acid.

7. A method according to claim 1, wherein the solvent used in the preparation of said solution of the polymer comprises concentrated sulphuric acid of concentration at least 90%.

8. A method according to claim 1, wherein a film of the solution is cast onto a plane non-porous surface.

9. A method according to claim 1, wherein the concentration of the polymer in solution in the solvent is at least 16%.

* * * * *